(12) United States Patent
McNatt

(10) Patent No.: US 9,538,736 B1
(45) Date of Patent: Jan. 10, 2017

(54) AUTOMATIC FISH ATTRACTANT DISPENSING LURE

(71) Applicant: John M. McNatt, Port Aransas, TX (US)

(72) Inventor: John M. McNatt, Port Aransas, TX (US)

( * ) Notice: Subject to any disclaimer, the term of this patent is extended or adjusted under 35 U.S.C. 154(b) by 250 days.

(21) Appl. No.: 14/550,116

(22) Filed: Nov. 21, 2014

Related U.S. Application Data

(60) Provisional application No. 61/907,183, filed on Nov. 21, 2013.

(51) Int. Cl.
*A01K 85/00* (2006.01)
*A01K 85/01* (2006.01)

(52) U.S. Cl.
CPC ..................................... *A01K 85/01* (2013.01)

(58) Field of Classification Search
USPC ............................................. 43/42.06, 42.35
See application file for complete search history.

(56) References Cited

U.S. PATENT DOCUMENTS

| | | | | |
|---|---|---|---|---|
| 2,532,879 A | * | 12/1950 | Baker | A01K 85/16 |
| | | | | 43/42.06 |
| 2,794,287 A | * | 6/1957 | Mancuis, Jr. | A01K 85/16 |
| | | | | 43/42.02 |
| 3,066,434 A | | 12/1962 | Duller | |
| 4,267,658 A | * | 5/1981 | Brown | A01K 97/02 |
| | | | | 43/42.06 |
| 4,839,983 A | | 6/1989 | Pippert | |
| 4,887,376 A | | 12/1989 | Sibley et al. | |
| 4,927,643 A | | 5/1990 | D'Orazio et al. | |
| 4,962,609 A | | 10/1990 | Walker | |
| D335,167 S | | 4/1993 | Miller | |
| 5,333,405 A | | 8/1994 | Bowles | |
| 5,485,697 A | * | 1/1996 | Watson | A01K 85/01 |
| | | | | 43/17.1 |
| 6,668,482 B1 | | 12/2003 | Ruffin et al. | |
| 6,807,766 B1 | | 10/2004 | Hughes et al. | |
| 7,788,841 B1 | * | 9/2010 | Donarummo | A01K 85/01 |
| | | | | 43/42.02 |
| 8,287,155 B2 | * | 10/2012 | Leung | A01K 85/01 |
| | | | | 362/253 |
| 8,359,781 B2 | * | 1/2013 | Mancuso | A01K 85/01 |
| | | | | 43/17.1 |
| 2002/0014031 A1 | | 2/2002 | Brinkman | |
| 2004/0176519 A1 | | 9/2004 | Shelton | |
| 2009/0007480 A1 | * | 1/2009 | Braun | A01K 85/01 |
| | | | | 43/17.1 |
| 2015/0334999 A1 | * | 11/2015 | Blakey | A01K 69/06 |
| | | | | 43/4.5 |

\* cited by examiner

*Primary Examiner* — Christopher P Ellis
(74) *Attorney, Agent, or Firm* — Robert C. Montgomery; Montgomery Patent & Design

(57) ABSTRACT

A fish attractant dispensing lure includes a housing with at least one (1) ejection channel, a dispenser unit, and a power source. The lure housing encases the dispenser unit, which is configured to retain a volume of a fish attractant in a liquid state. A dispensing mechanism is in electrical communication with the power source. When the dispenser unit is activated, the fish attractant is dispensed into the surrounding environment via the dispensing mechanism through at least one (1) ejection channel.

18 Claims, 3 Drawing Sheets

AUTOMATIC FISH ATTRACTANT DISPENSING LURE

RELATED APPLICATIONS

The present invention is a continuation-in-part of, was first described in, and claims the benefit of U.S. Provisional Application No. 61/907,183, filed Nov. 21, 2013, the entire disclosures of which are incorporated herein by reference.

FIELD OF THE INVENTION

The present invention relates to a fishing lure that automatically dispenses fish attractant via a controlled dispensing process.

BACKGROUND OF THE INVENTION

The technology used by anglers to catch fish has become increasingly complex in nature. Fishermen no longer rely solely on the traditional hook and worm approach to attract their game. Instead, a broad range of products have hit the market, designed to aid the fisherman to catch more fish quickly. One (1) of the more popular aids is that of various liquids that is applied to lures in an effort to attract fish based upon scent or smell. While such aids have generated some success, they do suffer from the fact that insertion in water tends to quickly wash the attractant off. This forces the fisherman to frequently remove the lure from the water and re-apply the liquid. This results in a reduced period of time that fishing is actually taking place, and may scare fish away due to the noise of frequent lure removal and re-casting. Accordingly, there is a need for a means by which the advantages of using chemical style attractants to attract fish can be enhanced to ensure that more fish are caught. The development of the present invention fulfills this need.

SUMMARY OF THE INVENTION

It is therefore an object of the present invention to provide such a fishing lure that automatically dispenses an attractant for fish, for the purposes of aiding in the catching fish. Such a dispensing device includes a hollow, fluid-tight casing. The casing is capable of receiving a soluble fish attractant therein. A dispensing mechanism is powered by an on-board power source to dispense the attractant out into the water via at least one (1) conduit. In at least one (1) embodiment, the casing is shaped generally like a cylinder tapering to a conical point at a first end thereof.

An object of the present invention is to provide such a reservoir having an inlet end terminating in a fill nipple exiting out the casing second end. A cap is removably attachable to the nipple. The outlet end of the reservoir is in fluid communication with a chamber, which the dispensing mechanism is in fluid communication therewith. A check valve exists at the outlet end to provide one-way flow of attractant through the reservoir.

Another object of the present invention is to provide such a dispensing mechanism having a solenoid in electrical communication with the power source. The solenoid drives a shaft of plunger relative to the chamber. The outlet of the chamber is in fluid communication with each conduit. Upon activation of the solenoid, the plunger draws attractant from the reservoir, in to the chamber, and into each conduit for dispensing out in to the water.

Yet another object of the present invention provides for a control means to control the dispensing mechanism. A preferred embodiment utilizes a control switch disposed on a surface of the casing to selectively activate the dispensing mechanism. Another embodiment involves the use of a timer circuit placed in electrical communication with the solenoid and control switch. The timer circuit activates the solenoid to drive the shaft of the plunger at a set frequency, thereby dispensing attractant from the reservoir at the set frequency.

Still yet another object of the present invention is to provide at least one (1) fastening mechanism affixed to an exterior surface of the casing. The fastening mechanisms are capable of providing a place to fasten a treble hook, a trolling line, or other similar fishing accessories. In a preferred embodiment, the fastening mechanisms are eyelets.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
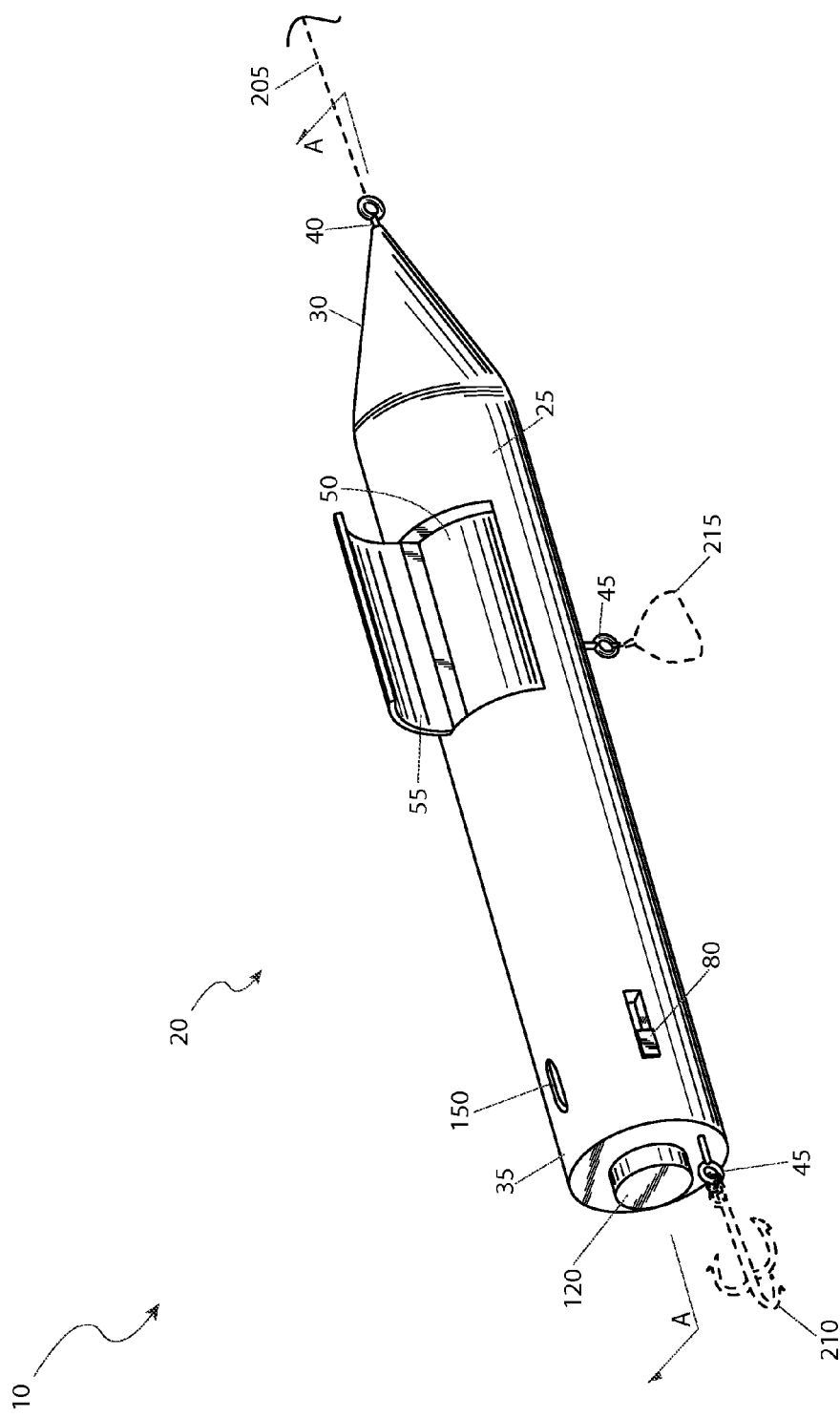
FIG. 1 is an isometric view of a fishing lure 10 in accordance with the preferred embodiment of the present invention.

DESCRIPTIVE KEY 10 fishing lure
20 housing
25 first end
30 cone
35 second end
40 first fastener
45 second fastener
50 battery compartment
55 access cover
60 power source
65 electrical circuit
70 timer
75 electrical wiring
80 control switch
85 solenoid
100 dispensing unit
110 reservoir
115 inlet port
120 cap
122 fill nipple
125 check valve
130 piston
135 piston chamber
140 shaft
145 ejection channel
150 ejection port
200 attractant
205 trolling line
210 hook
215 sinker

DETAILED DESCRIPTION OF THE PREFERRED EMBODIMENT

Figure 2:
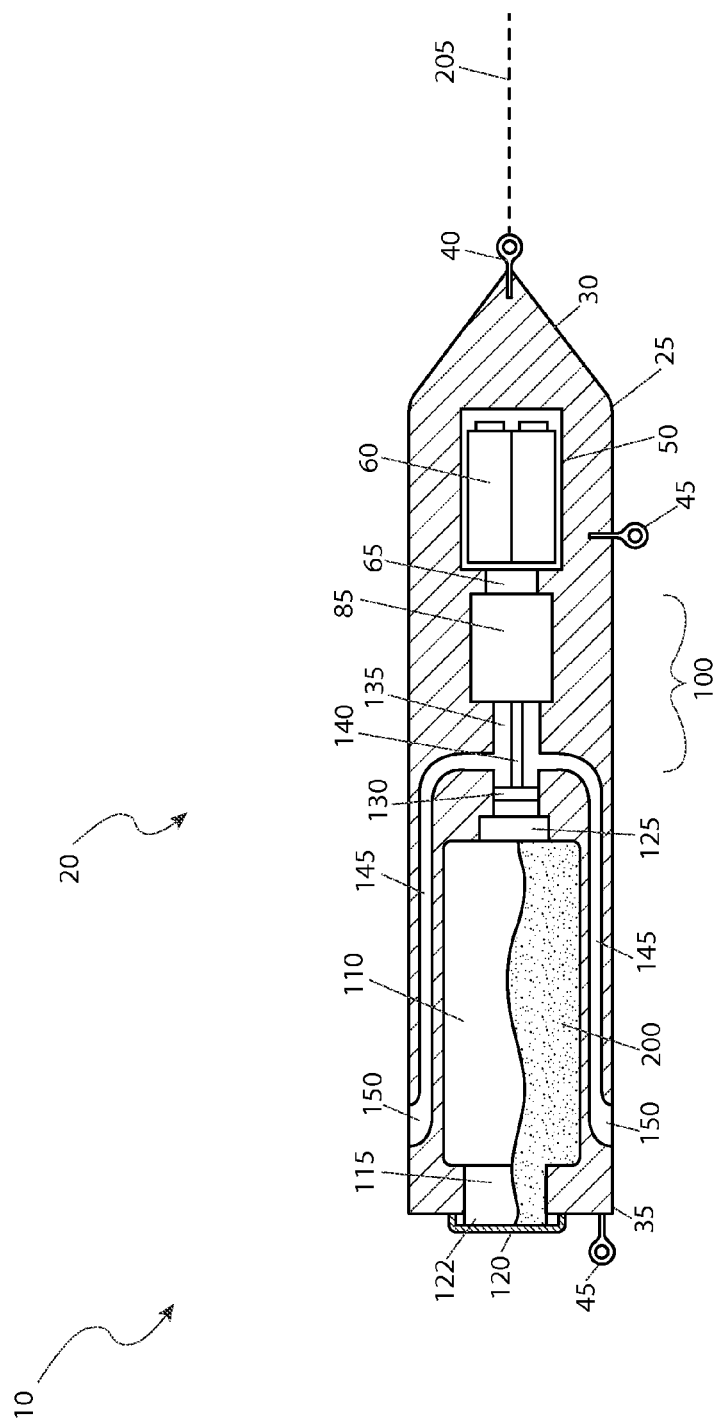
FIG. 2 is a section view along a line A-A as shown on FIG. 1 of the fishing lure 10 in accordance with the preferred embodiment of the present invention; and, FIG. 3 is an electro-mechanical schematic of the fishing lure 10 in accordance with the preferred embodiment of the present invention.
Figure 3:
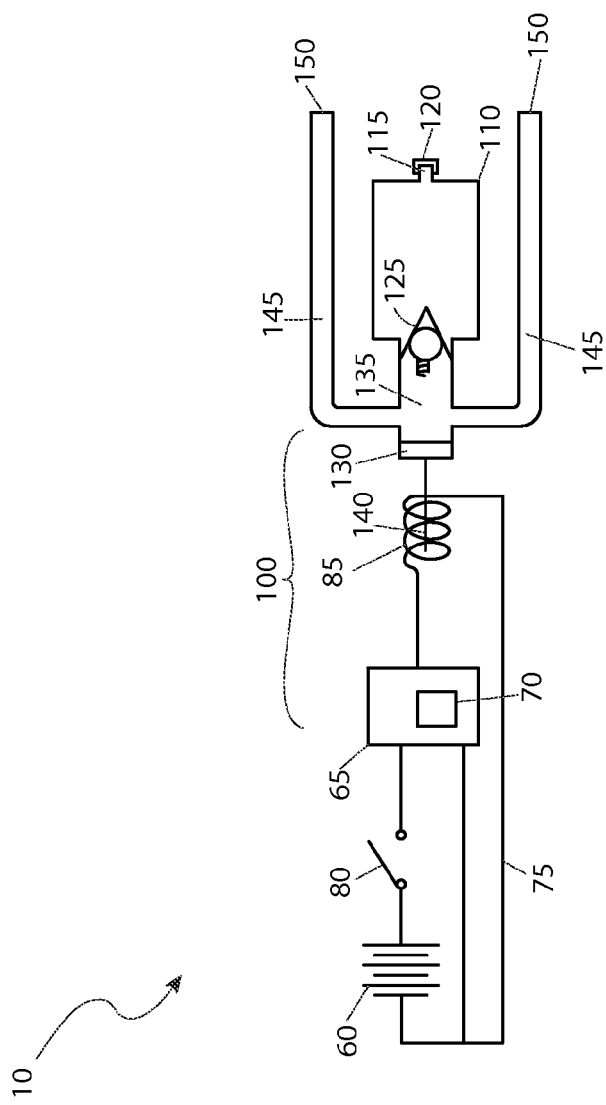

The best mode for carrying out the invention is presented in terms of its preferred embodiment, herein depicted within FIGS. 1 through 3. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one (1) of the referenced items.

The present invention describes a fishing lure (herein referred to as the "device") 10, which has a dispensing unit 100 encased within a housing 20 that automatically draws an attractant 200 from a reservoir 110 and expels that attractant 200 through ejection ports 150 to create an allure for fish within the vicinity of the device 10.

Referring now to FIG. 1, an isometric view, and FIG. 2, a section along line A-A as seen in FIG. 1, of the device 10, in accordance with the preferred embodiment of the present invention, are disclosed. The device 10 primarily comprises a housing 20 with an internal dispensing unit 100 and a reservoir 110 configured to contain a user-supplied fish attractant 200. The housing 20 is preferably constructed of a plurality of injection-molded thermoplastic pieces fitted together in a manufacturing process necessary to yield the finished product in the shape of a cylinder having a conical first end 25. Other materials, such as a metal, or a composite material, as well as other shapes, may be utilized without limiting the scope of the device 10. The first end 25 terminates in a cone 30 which may be defined by a linear function yielding a uniformly increasing diameter, or as an elliptic paraboloid, or some combination thereof, so as to conform to some stylized profile. The housing 20 is provided with a first fastener 40 located at the cone 30 of the first end 25 as a means to be connected to a user's trolling line 205. The first fastener 40 may be formed as a part of the housing 20 or inserted into the cone 30 in a subsequent operational procedure and as such may be composed of a metal eyelet or other such annular ring.

The device 10 is envisioned to be mistakenly viewed by a fish as a source of nutrition, and taken in, as a whole, by a fish's mouth. The incorporation of at least one (1) hook 210, borne on an exterior portion of the device 10, is foreseen as necessary to provisionally attach the device to some interior portion of a fish. The device 10 may be deemed more functional with the addition of supplementary weights in the form of traditional sinkers 215, comprised of lead weights, at the discretion of a user. The device 10 will preferably be equipped with a plurality of second fasteners 45 for the attachment of at least one (1) hook 210 of any style and sinker 215 for angling. The second fasteners 45 are configured to be eyelets, similar to the first fastener 40, to which the hook(s) 210 and sinker(s) 215 may be clipped, tied, or otherwise attached. In alternate embodiments, the size and location of such second fasteners 45 may vary according to the preference of an individual user.

The reservoir 110 is configured to be a cylindrical void within the housing 20. It is understood that other geometric configurations for the reservoir 110 may be utilized according to any manufacturing process as may be employed without limiting the scope of the device 10. An inlet port 115 located at a first end of the reservoir 110 and coincidentally at a second end 35 of the housing 20 provides access to the reservoir 110 from the exterior of the housing 20. The inlet port 115 extends through a fill nipple 122 which extends from the housing 20. The inlet port 115 enables a user to refill the reservoir 110 after the attractant 200 has been depleted due to normal use. A cap 120 is further provided to cover the inlet port 115. The cap 120 is configured to be a closure device for the reservoir 110 which may be operationally threaded onto the fill nipple 122, or secured by some other appropriate means so as to prevent the unintended escape of the attractant 200.

The attractant 200 is preferably a liquid solution that incorporates a particular scent and flavor creating an allure toward the device 10 and incites a fish to attempt to consume the device 10. Some fish will hit on a lure 10 merely due to the scent, while others will nibble before biting to determine an affinity towards the lure 10. Nonetheless, a liquid form of the attractant 200 is important to the operability of the device 10.

A second end of the reservoir 110 leads to a piston chamber 135, via a check valve 125. The piston chamber 135 is configured to be a cylindrical chamber for the accommodation of a disk-shaped piston 130. The piston chamber 135 provides a passageway for the attractant 200 to at least one (1) ejection channel 145 leading to each ejection port 150. In a preferred embodiment, there exists two (2) ejection channels 145 and ejection ports 150 arranged symmetrically about the housing 20. The check valve 125 is a commercially available hydraulic fitting capable of permitting a flow of attractant 200 to exit from the reservoir 110 while prohibiting any return flow into the reservoir 110. The piston 135, when actuated, traverses the piston chamber 135 in a reciprocating manner. The piston 135 is connected to a solenoid 85 via a cylindrical shaft 90 so that when the solenoid 85 acts upon the shaft 90 the piston 135 is forced to execute the reciprocating motion. As the piston 135 moves away from the reservoir 110 in the piston chamber 135, the attractant 200 is drawn into the piston chamber 135 through the check valve 125. As the piston 135 moves toward the reservoir 110, the check valve 125 disallows the attractant 200 from reentering the reservoir 110, rather forcing the attractant 200 to exit the piston chamber 220 through each ejection channel 145. Each ejection channel 145 is a configured to be a conduit directing fluid flow toward an ejection port 150. The housing 20 is provided with at least one (1) ejection port 150 located in proximity to a second end 35. As attractant 200 is forced into each ejection channel 145, the attractant 200 is dispensed through the ejection port 150. The check valve 125 is configured to be spring biased in a closed position so as to retain the attractant 200 in the reservoir 110 unless acted upon by the piston 135.

The housing 20 is further provided with a battery compartment 50 equipped with electrical contacts (not shown), which place a source 80 into electrical communication with the electrical circuit 65 of the device 10. A battery compartment access cover 55 encloses and seals the battery compartment 50 in a watertight manner.

Referring now to FIG. 3, an electro-mechanical schematic of the device 10, in accordance with the preferred embodiment of the present invention, is disclosed. The electrical circuit 65 of the device 10 is configured to place the electrical contacts (not shown) into electrical communication with a control switch 80 and the electrical circuit 65 via the electrical wiring 75. The control switch 80 is preferably an "ON/OFF" slide switch. Other types of single-pole, single-throw switches, such as rocker switches, may also be utilized without limiting the scope of the device 10. In an "ON" position, electrical power is supplied from the power source 60 to the timer 70 and ultimately the solenoid 85.

When energized, the timer 70 begins an oscillatory cycle of electrical connectivity. The timer 70 is placed within the electrical circuit 65 between the electrical contacts and the solenoid 85 so that electrical power is supplied to the solenoid 85 when the oscillatory cycle of connectivity commences. The timer 70 is configured to be a CMOS integrated circuit producing oscillatory connectivity; however, other timers 70 may be utilized without limiting the scope of the device 10. The repetitive, oscillating signal supplied to the solenoid 85 actuates the piston 130 in an oscillatory manner mimicking the frequency of the oscillating signal. As the piston 130 actuates, it draws attractant 200 from the reservoir 110 as previously described.

In use, a trolling line 205 is affixed to the first fastener 40, the control switch 80 is set to an "ON" position, and the device 10 is cast into the water. The dispenser unit 100 gradually dispenses attractant 200 over a period of time as previously cited to maintain a consistent and continuing allure for fish within the vicinity of the device 10 until the device 10 has depleted the attractant 200 within the reservoir 110. The device 10 may be removed from the water to be refilled with attractant 200 via the inlet port 115.

The preferred embodiment of the present invention can be utilized by an enabled individual in a simple and straightforward manner with little or no training After initial purchase or acquisition of the apparatus 10, it would be installed as indicated in FIG. 1. The method of installing and utilizing the device 10 may be achieved by performing the following steps: acquiring a model of the device 10 having a style to suit the preference of a user; ensuring the control switch 80 is in an "OFF" position; opening the access cover 55 of the battery compartment 50 and inserting a power source 60 within the battery compartment 50; closing the access cover 55 and ensuring that a proper seal has been made between the access cover 55 and battery compartment 50; removing the cap 120 and filling the reservoir 110 with attractant 200; replacing the cap 120; fastening a trolling line 205 to the first fastener 30; ensuring that a desired number and style of hooks 210 and sinkers 215 are attached to the second fastener 45 as desired; manipulating the control switch 80 so as to electrically energize the electrical circuit 65; casting the device 10 in waters that are to be fished; allowing the dispensing unit 100 to expel attractant 200 through each ejection port 150 to create an allure and affinity towards the device 10; and, removing the device 10 from the water and placing the control switch 80 in an "OFF" position when it is desired to stow the device 10 for later use.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A fish attractant dispensing lure comprising:
   a casing having a first end and a second end, further comprising:
      a hollow fluid-tight structure;
      a compartment capable of receiving and supporting a power source, said compartment formed within said structure and configured to be accessible from an exterior of said casing;
      a reservoir formed within said structure, capable of receiving a fluid therein;
      a chamber formed with said structure and in fluid communication with said reservoir; and,
      at least one conduit within said structure and in fluid communication with said chamber, wherein each conduit leads to an exterior of said structure;
   a dispensing mechanism within said chamber, further comprising:
      a solenoid;
      a shaft in mechanical connection with said solenoid;
      a plunger in mechanical connection with said shaft; and,
      a valve affixed at an interface between said chamber and said reservoir, wherein said valve permits one-way flow of fluid from said reservoir to said chamber; and,
   electrical circuitry running from said compartment to said solenoid to transfer electrical power from said power source to said solenoid; and,
   a control switch disposed on a surface of said casing and placed into electrical communication with said electrical circuitry, wherein said control switch selectively enables transfer of electrical power from said power source or interrupts said transfer;
   wherein said solenoid drives said plunger to draw said fluid from said reservoir, into said chamber, and out through each conduit.

2. The device recited in claim 1, wherein said second end of said casing is provided with an aperture leading into said reservoir.

3. The device recited in claim 2, further comprising a cap to cover said aperture.

4. The device recited in claim 1, further comprising a door to cover said compartment.

5. The device recited in claim 1, further comprising at least one fastening mechanism affixed to an outer surface of said casing.

6. The device recited in claim 5, wherein each fastening mechanism is an eyelet.

7. The device recited in claim 5, further comprising a first fastening mechanism at said first end of said casing, a second fastening mechanism at said second end of said casing, and a third fastening mechanism located at an intermediate location between said first end and said second end.

8. The device recited in claim 1, further comprising a timer circuit located within said casing and placed in electrical communication with said solenoid and said control switch, wherein said timer circuit generates oscillatory electrical power signals to said solenoid to controllably drive said shaft and said plunger at a set frequency.

9. The device recited in claim 1, wherein said casing has an oblong shape.

10. A fish attractant dispensing lure comprising:
    a casing having a first end terminating in a generally conical configuration and a second end, further comprising:

a hollow fluid-tight structure;
a compartment capable of receiving and supporting a power source, said compartment formed within said structure and configured to be accessible from an exterior of said casing;
a reservoir formed within said structure, capable of receiving a fluid therein;
a chamber formed with said structure and in fluid communication with said reservoir; and,
at least one conduit within said structure and in fluid communication with said chamber, wherein each conduit leads to an exterior of said structure;
a dispensing mechanism within said chamber, further comprising:
a solenoid;
a shaft in mechanical connection with said solenoid;
a plunger in mechanical connection with said shaft; and,
a valve affixed at an interface between said chamber and said reservoir, wherein said valve permits one-way flow of fluid from said reservoir to said chamber; and,
electrical circuitry running from said compartment to said solenoid to transfer electrical power from said power source to said solenoid; and,
a control switch disposed on a surface of said casing and placed into electrical communication with said electrical circuitry, wherein said control switch selectively enables transfer of electrical power from said power source or interrupts said transfer;
wherein said solenoid drives said shaft and said plunger to draw said fluid from said reservoir, into said chamber, and out through each conduit.

11. The device recited in claim 10, wherein said second end of said casing is provided with an aperture leading into said reservoir.

12. The device recited in claim 11, further comprising a cap to cover said aperture.

13. The device recited in claim 10, further comprising a door to cover said compartment.

14. The device recited in claim 10, further comprising at least one fastening mechanism affixed to an outer surface of said casing.

15. The device recited in claim 14, wherein each fastening mechanism is an eyelet.

16. The device recited in claim 14, further comprising a first fastening mechanism at said first end of said casing, a second fastening mechanism at said second end of said casing, and a third fastening mechanism located at an intermediate location between said first end and said second end.

17. The device recited in claim 10, further comprising a timer circuit located within said casing and placed in electrical communication with said solenoid and said control switch, wherein said timer circuit generates oscillatory electrical power signals to said solenoid to controllably drive said shaft and said plunger at a set frequency.

18. The device recited in claim 10, wherein said casing has an oblong shape.

* * * * *